(12) United States Patent
Matsuda

(10) Patent No.: US 8,180,850 B2
(45) Date of Patent: May 15, 2012

(54) DATA TRANSMISSION DEVICE, DATA TRANSMISSION SYSTEM AND ADDRESS REGISTRATION METHOD

(75) Inventor: Hideyuki Matsuda, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 541 days.

(21) Appl. No.: 12/212,150

(22) Filed: Sep. 17, 2008

(65) Prior Publication Data

US 2009/0083439 A1 Mar. 26, 2009

(30) Foreign Application Priority Data

Sep. 20, 2007 (JP) ................................. 2007-243799

(51) Int. Cl.
*G06F 15/16* (2006.01)

(52) U.S. Cl. ........ 709/217; 709/218; 709/219; 709/223; 709/224; 709/225

(58) Field of Classification Search .......... 709/217–219, 709/223–225
See application file for complete search history.

(56) References Cited

U.S. PATENT DOCUMENTS

| | | | | |
|---|---|---|---|---|
| 6,167,449 | A * | 12/2000 | Arnold et al. ................. | 709/227 |
| 6,564,216 | B2 * | 5/2003 | Waters ........................... | 709/223 |
| 7,293,067 | B1 * | 11/2007 | Maki et al. ..................... | 709/217 |
| 7,334,038 | B1 * | 2/2008 | Crow et al. .................... | 709/227 |
| 7,689,713 | B2 * | 3/2010 | Fornari ......................... | 709/238 |
| 2002/0124057 | A1 * | 9/2002 | Besprosvan ................... | 709/219 |
| 2005/0097199 | A1 * | 5/2005 | Woodard et al. .............. | 709/223 |

FOREIGN PATENT DOCUMENTS

| | | |
|---|---|---|
| JP | 2001-177540 | 6/2001 |
| JP | 2004-140607 A | 5/2004 |
| JP | 2004-185423 A | 7/2004 |
| JP | 2004-274505 A | 9/2004 |
| JP | 2005-026876 | 1/2005 |
| JP | 2007-087217 | 4/2007 |

OTHER PUBLICATIONS

Notification of Reasons for Rejection issued in corresponding Japanese Patent Application No. 2007-243799, mailed Oct. 13, 2009, and verified English translation thereof.

* cited by examiner

*Primary Examiner* — Phuoc Nguyen

(74) *Attorney, Agent, or Firm* — Buchanan Ingersoll & Rooney PC

(57) ABSTRACT

A data transmission device receives an instruction from a user via a user interface to search for address information registered in an LDAP server. An address management module of the data transmission device acquires the address information from the LDAP server, and a list of the address information is displayed to the user. When instructed by the user to register a piece of the address information, the address management module acquires an absolute path from the LDAP server, and requests an address management device to register the absolute path. The address management device registers the absolute path and notifies the address management module that the absolute path has been registered.

18 Claims, 12 Drawing Sheets

FIG. 12

| ADDRESS NAME | TRANSMISSION METHOD | OTHER INFORMATION |
|---|---|---|
| ADDRESS 1 | LDAP:CN=X, OU=Y, O=Z, C=Japan | PHOTO DATA, SCAN MODE |
| ADDRESS 2 | WSD:"ClientDisplayName" | PHOTO DATA, SCAN MODE |
| ADDRESS 3 | E-mail:abc@def.ghi.jp | PHOTO DATA, SCAN MODE |
| ... | ... | ... |

FIG. 13A

| ADDRESS NAME | TRANSMISSION METHOD | OTHER INFORMATION |
|---|---|---|
| ADDRESS 1 | REFERENCE RECIPIENT SETTING | PHOTO DATA, SCAN MODE |
| ADDRESS 2 | WSD:"ClientDisplayName" | PHOTO DATA, SCAN MODE |
| ADDRESS 3 | E-mail:abc@def.ghi.jp | PHOTO DATA, SCAN MODE |
| ... | ... | ... |

FIG. 13B

| ADDRESS NAME | TRANSMISSION METHOD | OTHER INFORMATION |
|---|---|---|
| ADDRESS 1 | LDAP:CN=X, OU=Y, O=Z, C=Japan | PHOTO DATA, SCAN MODE |
| ... | ... | ... |

DATA TRANSMISSION DEVICE, DATA TRANSMISSION SYSTEM AND ADDRESS REGISTRATION METHOD

This application is based on application No. 2007-243799 filed in Japan, the content of which is hereby incorporated by reference.

BACKGROUND OF INVENTION

1. Field of the Invention

The present invention relates to a data transmission device, a data transmission system and an address registration method, and in particular to technology for facilitating managing information necessary for data transmission.

2. Related Art

In recent years, it has become common for MFPs (Multi Function Peripherals) that transmit image data with the use of facsimile, e-mail, and other means of communication to have a pre-registered list of addresses (an address book) from which a user selects, in order to save the user the trouble of inputting an address.

However, when a plurality of MFPs are used together in an office environment etc., registering addresses and updating the address book in each MFP is troublesome. For this reason, various technologies have been provided in which addresses are collectively managed with use of an address management device, and address information is provided to the MFPs from the address management device.

One example is LDAP (Lightweight Directory Access Protocol, IETF RFC 2251~2256). LDAP is a protocol for accessing a database that manages information pertaining to e-mail addresses and environments on the Internet, an intranet, etc., and for providing address information to an MFP from an LDAP server.

When a plurality of users share an MFP, there are cases in which a large number of addresses are registered in the address book and finding a desired address is difficult, and there are cases in which an address must be kept private from other users. In such cases, it is desirable to manage a separate address book for each user.

However, since LDAP servers cannot manage user-specific address books, there is a need to newly provide a specialized address management device for managing user-specific address books.

At the same time, since LDAP servers often manage data used by the MFPs other than address books, keeping the original LDAP server is necessary even after the new address management device has been installed.

When an LDAP server and an address management device are used together, various data must be registered and updated in both the LDAP server and the address management device, and this management is troublesome. The same problem occurs when managing address information on a device other than an LDAP server.

SUMMARY OF INVENTION

The present invention has been achieved in view of the above problem, and an aim thereof is to provide a data transmission device, a data transmission system, and a data transmission method that reduce the trouble of maintaining address information in an environment that additionally includes a device for managing address information.

In order to achieve the above aim, one aspect of the present invention is a data transmission device connected via a network to an address management device that manages user-specific address information and a data storage device that stores non-user-specific address information, the data transmission device including a first address acquisition part operable to acquire the non-user-specific address information from the data storage device; a selection receiver operable to present the non-user-specific address information acquired from the data storage device to a user, and receive, from the user, a selection designating an address information piece to be registered in the address management device; and a first address registration part operable to acquire, from the data storage device, location information that indicates a location of the selected address information piece in the data storage device and to cause the address management device to register the acquired location information.

According to this structure, provided that address information stored in the data storage device has been updated, the data transmission device can acquire the updated address information from the data storage device via the address management device, even if location information managed by the address management device has not been updated. This structure enables reducing the trouble of maintaining the address information.

In such a case, the data transmission device may further include a request receiver operable to receive an address information registration request from the user, the address information registration request being a request for registration of a piece of new address information; a storage requester operable to request the data storage device to store the new address information; and a second address registration part operable to acquire, from the data storage device, location information that includes a location of the piece of address information in the data storage device, and cause the address management device to register the location information of the new address information. This structure enables reducing the trouble of registering new address information.

Also, the data transmission device may further include a third address registration part operable, if the storage requester fails to cause the data storage device to store the new address information, to cause the address management device to register the new address information in place of the location information of the new address information. According to this structure, even if the address information cannot be stored in the data storage apparatus for some reason, the address information can be reliably registered in the address management device.

The data transmission device may further include an address requester operable to request the address management device to acquire, with use of the registered location information, the address information piece from the data storage device. According to this structure, the data transmission device can efficiently acquire address information at the time of data transmission.

Also, the data transmission device may include a second address acquisition part operable to acquire a piece of the user-specific address information from the address management device; and a notifier operable to compare a piece of the non-user-specific address information acquired by the first address acquisition part and the piece of user-specific address information acquired by the second address acquisition part, and notify the user whether a difference exists therebetween. This structure enables easily detecting a difference between the address information stored in the data storage device and the address information stored in the address management device.

In the above data transmission device, for example, the data storage device may be an LDAP server, and the location information may be an absolute path of an entry managed by the LDAP server that stores the address information.

Also, in the above data transmission device, each address information piece in the user-specific address information and the non-user-specific address information may include a transmission method and a destination identifier used in the transmission method. In such a case, each transmission method may preferably be any of E-mail, FAX, FTP, SMB and WebDAV.

Another aspect of the present invention is a data transmission system including a data transmission device and an address management device that manages user-specific address information, the data transmission system being connected via a network to a data storage device that stores non-user-specific address information, wherein the data transmission device includes a first address acquisition part operable to acquire the non-user-specific address information from the data storage device; a selection receiver operable to present the non-user-specific address information acquired from the data storage device to a user, and receive, from the user, a selection designating an address information piece to be registered in the address management device; and a first address registration part operable to acquire, from the data storage device, location information that indicates a location of the selected address information piece in the data storage device and to cause the address management device to register the acquired location information.

According to this structure, provided that address information stored in the data storage device has been updated, the data transmission device can acquire the updated address information from the data storage device via the address management device, even if location information managed by the address management device has not been updated. This structure enables reducing the trouble of maintaining the address information.

The data transmission system of the present invention may further include a request receiver operable to receive an address information registration request from the user, the address information registration request being a request for registration of a piece of new address information; a storage requester operable to request the data storage device to store the new address information; and a second address registration part operable to acquire, from the data storage device, location information that includes a location of the piece of address information in the data storage device, and cause the address management device to register the location information of the new address information. This structure enables reducing the trouble of registering new address information.

The data transmission system of the present invention may further include a third address registration part operable, if the storage requester fails to cause the data storage device to store the new address information, to cause the address management device to register the new address information in place of the location information of the new address information. According to this structure, the address information can be reliably registered in the address management device.

In the data transmission system of the present invention, the data transmission device may further include an address requester operable to request the address management device to acquire the address information piece from the data storage device, and the address management device may include an address transmitter operable, if the request to acquire the address information piece has been received, and furthermore the location information has been registered, to acquire, with use of the registered location information, the address information piece from the data storage device, and transmit the acquired address information to the data transmission device.

According to this structure, the data transmission device can efficiently acquire address information at the time of data transmission.

In the data transmission system of the present invention, the data transmission device may further include a notifier operable to compare the piece of the address information acquired by the first address acquisition part and the piece of the address information acquired by the address requester, and notify the user whether a difference exists therebetween. This structure enables easily detecting a difference between the address information stored in the data storage device and the address information stored in the address management device.

In the data transmission system of the present invention, the address management device may further include a recipient setting memory operable to store a recipient setting for receiving user-specific data, the recipient setting being one of an address information piece and location information of the address information piece, and wherein the data transmission device specifies, with reference to the recipient setting, address information for transmitting data to the user. According to this structure, managing address information is facilitated even in a case of causing the data transmission device to transmit data by a method preferred by a recipient.

Also, another aspect of the present invention is an address registration method performed in a data transmission system including a data transmission device and an address management device that manages user-specific address information, the data transmission system being connected via a network to a data storage device that stores non-user-specific address information, including an address acquisition step in which the data transmission device acquires the non-user-specific address information from the data storage device; a selection reception step in which the data transmission device presents the non-user-specific address information acquired from the data storage device to a user, and receives, from the user, a selection designating an address information piece to be registered in the address management device; and an address registration step in which the data transmission device acquires, from the data storage device, location information that indicates a location of the selected address information piece in the data storage device and causes the address management device to register the acquired location information.

Also, the program pertaining to the current invention is a program that is executed by a computer including a data transmission device connected via a network to an address management device that manages user-specific address information and a data storage device that stores non-user-specific address information, the program including address acquisition processing in which the non-user-specific address information is acquired from the data storage device; selection reception processing in which the non-user-specific address information acquired from the data storage device is presented to a user, and a selection designating an address information piece to be registered in the address management device is received from the user; and address registration processing in which location information that indicates a location of the selected address information piece in the data storage device is acquired from the data storage device, and the address management device is caused to register the acquired location information.

BRIEF DESCRIPTION OF DRAWINGS

These and other objects, advantages, and features of the invention will become apparent from the following descrip- In the drawings:

FIG. 12 is a table exemplifying a data structure of address information stored in an address management device pertaining to variation 2 of the present invention; and FIG. 13A is a table exemplifying a data structure of address information stored in an address management device pertaining to variation 3 of the present invention, and FIG. 13B is a table exemplifying a data structure of recipient settings stored in the address management device pertaining to variation 3 of the present invention.

DESCRIPTION OF PREFERRED EMBODIMENT

The following describes an embodiment of a data transmission device and data transmission system of the present invention with reference to the drawings.

1. Structure of the Data Transmission System

First, the structure of the data transmission system pertaining to the embodiment of the present invention is described below.

Figure 1:
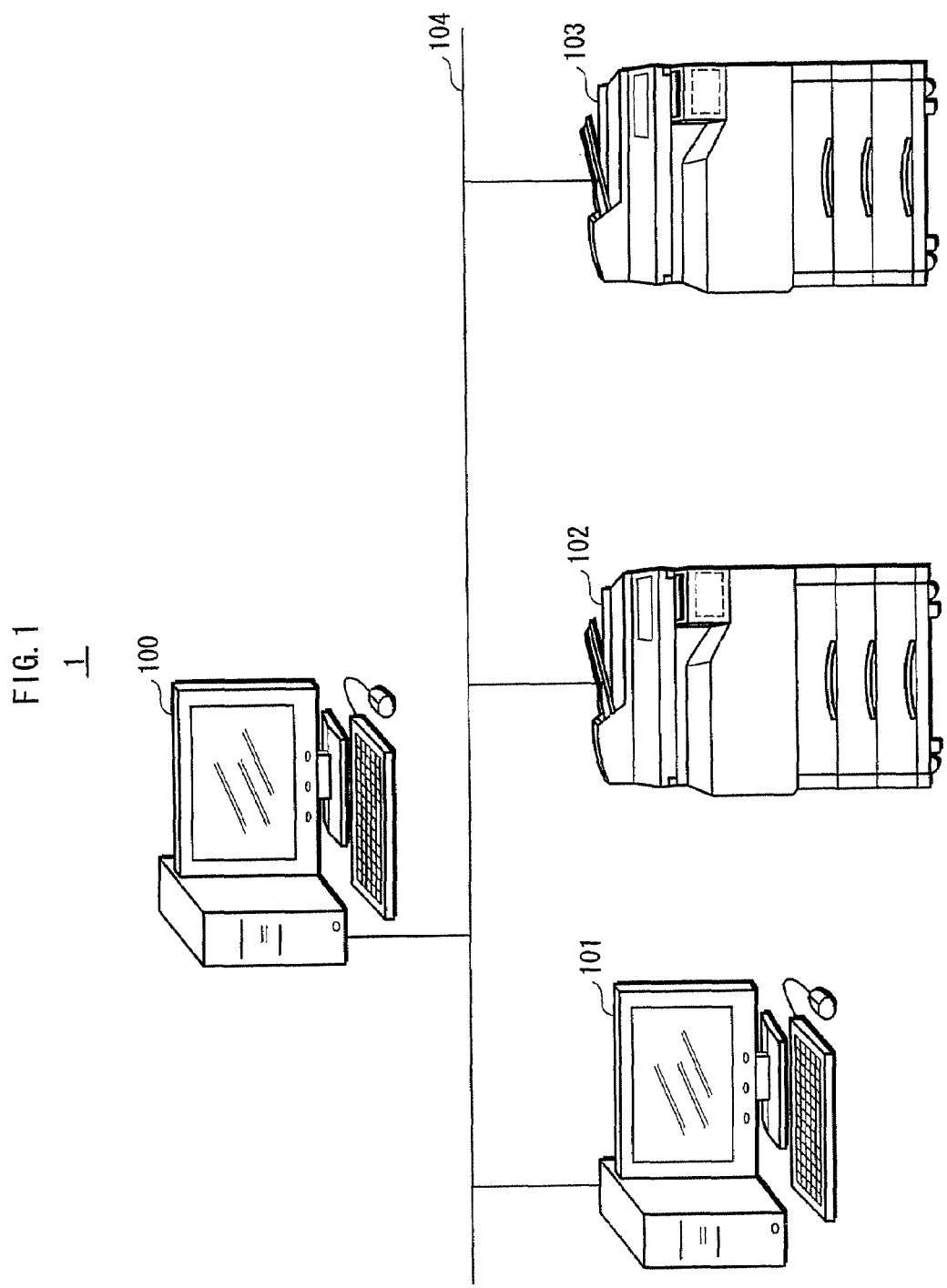
FIG. 1 shows the structure of a data transmission system pertaining to the embodiment of the present invention.

As shown in FIG. 1, a data transmission system 1 pertaining to the present embodiment is constituted from an address management device 100, an LDAP server 101 used as a data storage device, and data transmission devices 102 and 103, which are interconnected via a LAN (Local Area Network) 104.

The address management device 100 stores a user-specific address book for each registered user of the data transmission devices 102 and 103, and transmits a user-specific address book in accordance with a request from one of the data transmission devices 102 and 103.

The LDAP server 101 includes a database that stores address information and the like, and transmits content stored in the database in response to a request from an LDAP client (here, one of the data transmission devices 102 and 103, and the address management device 100).

The data transmission devices 102 and 103 limit their use to registered users by performing user authorization. Also, before transmitting data or the like to other devices, the data transmission devices 102 and 103 acquire a user-specific address book from the address management device 100 and display the content in order to cause the user to select a desired address therefrom.

2. Structure of the Address Management Device

Next, the structure of the address management device 100 is described below.

1. Hardware Structure

Figure 2:
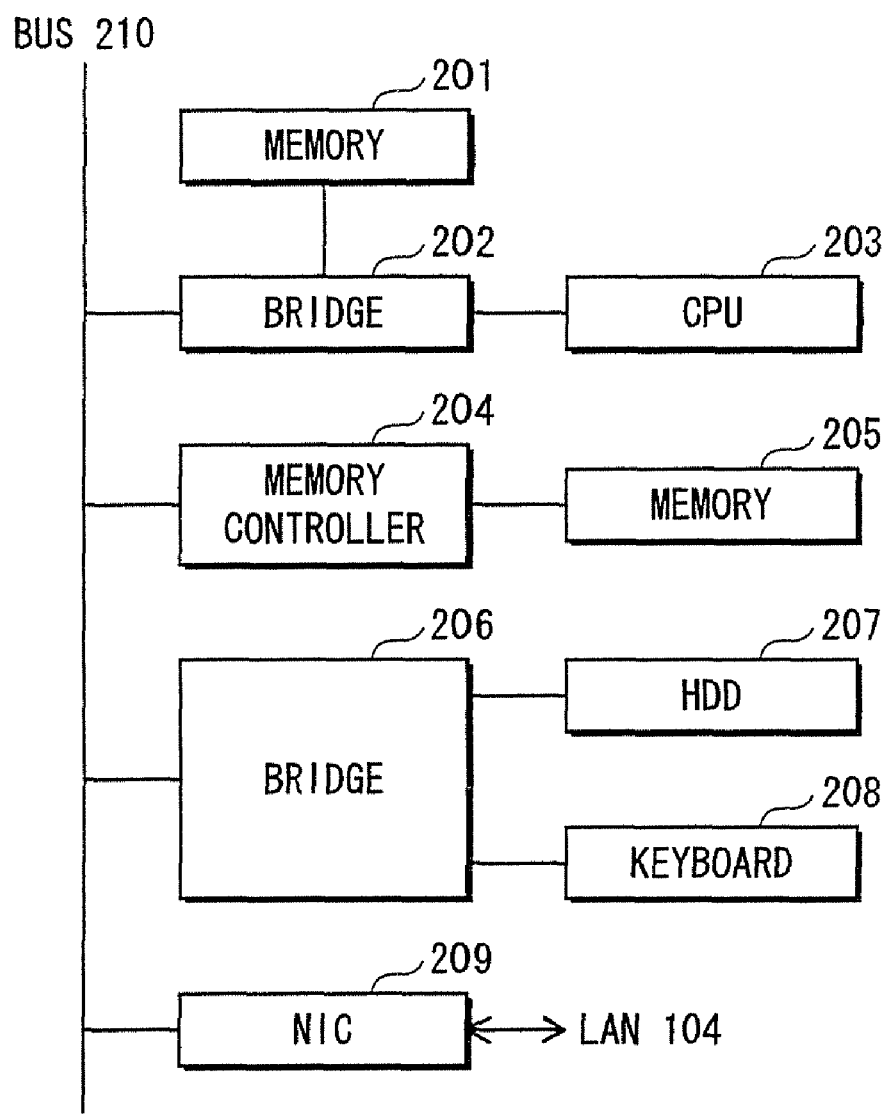
FIG. 2 shows the main hardware structure of an address management device 100 pertaining to the embodiment of the present invention.

FIG. 2 shows the main hardware structure of the address management device 100. As shown in FIG. 2, the address management device 100 includes a CPU (central processing unit) 203, memories 201 and 205, bridges 202 and 206, a memory controller 204, an HDD (hard disk drive) 207, a keyboard 20S, an NIC (network interface card) 209, and a bus 210.

The bridges 202 and 206, the memory controller 204 and the NIC 209 are interconnected via the bus 210. The CPU 203 and the memory 201 are connected to the bus 210 via the bridge 202. The memory 205 is connected to the bus 210 via the memory controller 204, and the HDD 207 and the keyboard 208 are connected to the bus 210 via the bridge 206.

The NIC 209 updates an address book upon receiving a request from one of the data transmission devices 102 and 103 via a LAN 104. The address book is stored on the HDD 207.

2. Functional Structure

Next, the functional structure of the address management device 100 is described below.

Figure 3:
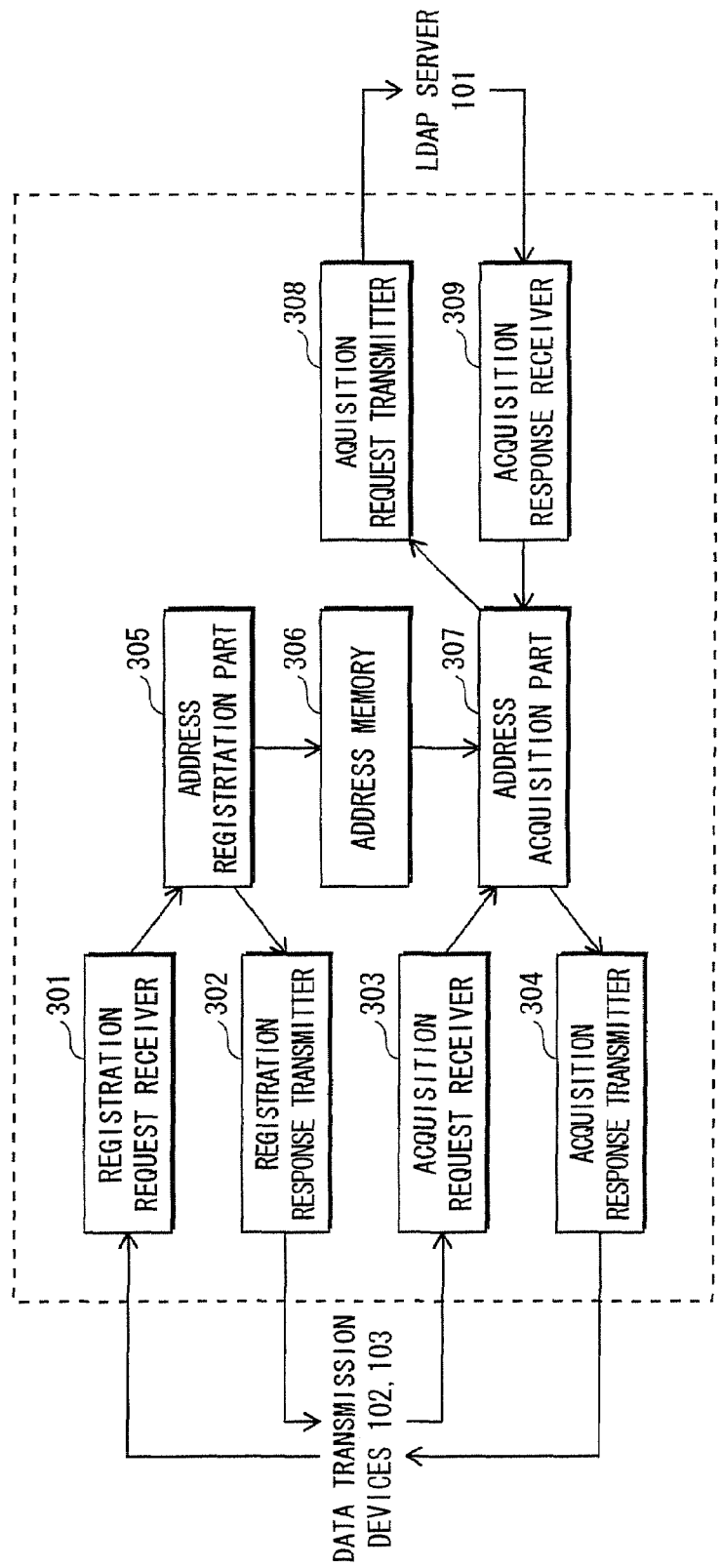
FIG. 3 is a block diagram showing the main functional structure of the address management device 100 pertaining to the embodiment of the present invention.

FIG. 3 is a block diagram showing the main functional structure of the address management device 100. As shown in FIG. 3, the address management device 100 includes a registration request receiver 301, a registration response transmitter 302, an acquisition request receiver 303, an acquisition response transmitter 304, an address registration part 305, an address memory 306, an address acquisition part 307, an acquisition request transmitter 308, and an acquisition response receiver 309.

The registration request receiver 301 receives, from one of the data transmission devices 102 and 103, a registration request for address information to be registered in an address book.

In response to the registration request received by the registration request receiver 301, the registration response transmitter 302 transmits, to the data transmission devices 102 and 103, a registration response indicating that the address information has been registered in the address book.

The acquisition request receiver 303 receives an address information acquisition request from one of the data transmission devices 102 and 103.

In response to the acquisition request received by the acquisition request receiver 303, the acquisition response transmitter 304 transmits the requested address information to the data transmission devices 102 and 103.

The address registration part 305 stores address information in the address memory 306 in accordance with a registration request from one of the data transmission devices 102 and 103.

The address memory 306 stores address information separately for each address book.

The address acquisition part 307 acquires address information from the address memory 306 in accordance with a registration request from one of the data transmission devices 102 and 103. When the address information is an absolute path of the LDAP server 101, the address information is acquired from the LDAP server 101.

The acquisition request transmitter 308 specifies the absolute path of the LDAP server 101 and transmits an address information acquisition request.

The acquisition response receiver 309 receives the requested address information from the LDAP server 101.

3. Structure of the Data Transmission Device

The following describes the structure of the data transmission device 102. Since the data transmission device 103 has the same structure as the data transmission 102, the description of the data transmission device 102 is also applicable to the data transmission device 103.

1. Hardware Structure

First, the hardware structure of the data transmission device 102 is described below.

Figure 4:
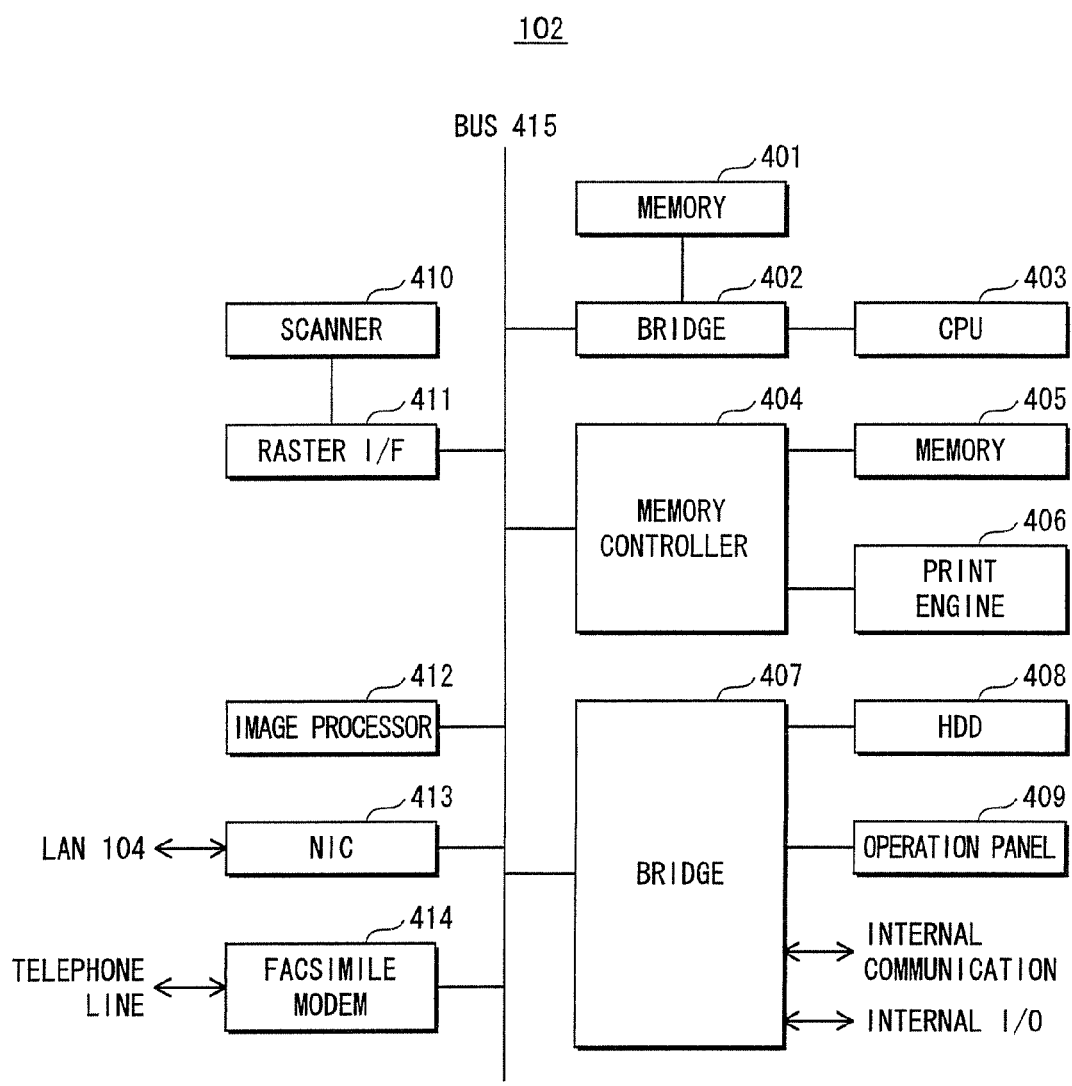
FIG. 4 is a block diagram showing the main hardware structure of a data transmission device 102 pertaining to the embodiment of the present invention.

FIG. 4 is a block diagram showing the main hardware structure of the data transmission device 102. As shown in FIG. 4, the data transmission device 102 includes a CPU 403, memories 401 and 405, bridges 402 and 407, a memory controller 404, a print engine 406, an HDD 408, an operation panel 409, a scanner 410, a raster interface 411, an image processor 412, an NIC 413, a facsimile modem 414 and a bus 415.

The bridges 402 and 407, the memory controller 404, the raster interface 411, the image processor 412, the NIC 413 and the facsimile modem 414 are interconnected via the bus 415. The CPU 403 and the memory 401 are connected to the bus 415 via the bridge 402. The memory 405 and the print engine 406 are connected to the bus 415 via the memory controller 404, and the HDD 408 and the operation panel 409 are connected to the bus 415 via the bridge 407. The scanner 410 is connected to the bus 415 via the raster interface 411.

The NIC 413 registers address information on, and acquires address information from, the address management device 100 via the LAN 104.

The image processor 412 retrieves image data from the memory 405, and after performing image processing thereon, rewrites the processed image data to the memory 405. The processed image data is transferred to the print engine 406 via the memory controller 404, and used in image formation.

Image data scanned by the scanner 410 is written to the memory 405 via the raster interface 411, and after being processed by the image processor 412, is formed into an image by the print engine 406.

The image data scanned by the scanner 410 is transmitted by the NIC 413 with use of a function such as Scan To E-mail (IETF RFC2305, ITU-T T.37), Scan To FTP (IETF RFC959), SMB (Server Message Block), or WebDAV (Web-based Distributed Authoring and Versioning, IETF RFC2518).

The HDD 408 stores address information. The operation panel 409 receives an input of address information from the user and displays address information acquired from the address management device 100.

The facsimile modem 414 is a modem for performing facsimile communication via a telephone line, and is compliant with G3 standards. Needless to say, a type of facsimile modem other than a G3 standards-compliant facsimile modem may be used, such as a G4 standards-compliant facsimile modem that uses an ISDN line.

Regardless of whether the NIC 413 or the facsimile modem 414 is used, the data transmission device 102 can transmit data with reference to address information included in an address book. Also, the data transmission device 102 may transmit data with use of address information input by the user on the operation panel 409.

The data transmission device 102 transmits image data and text data. Also, audio data may be transmitted.

2. Functional Structure

Next, the functional structure of the data transmission device 102 is described below.

Figure 5:
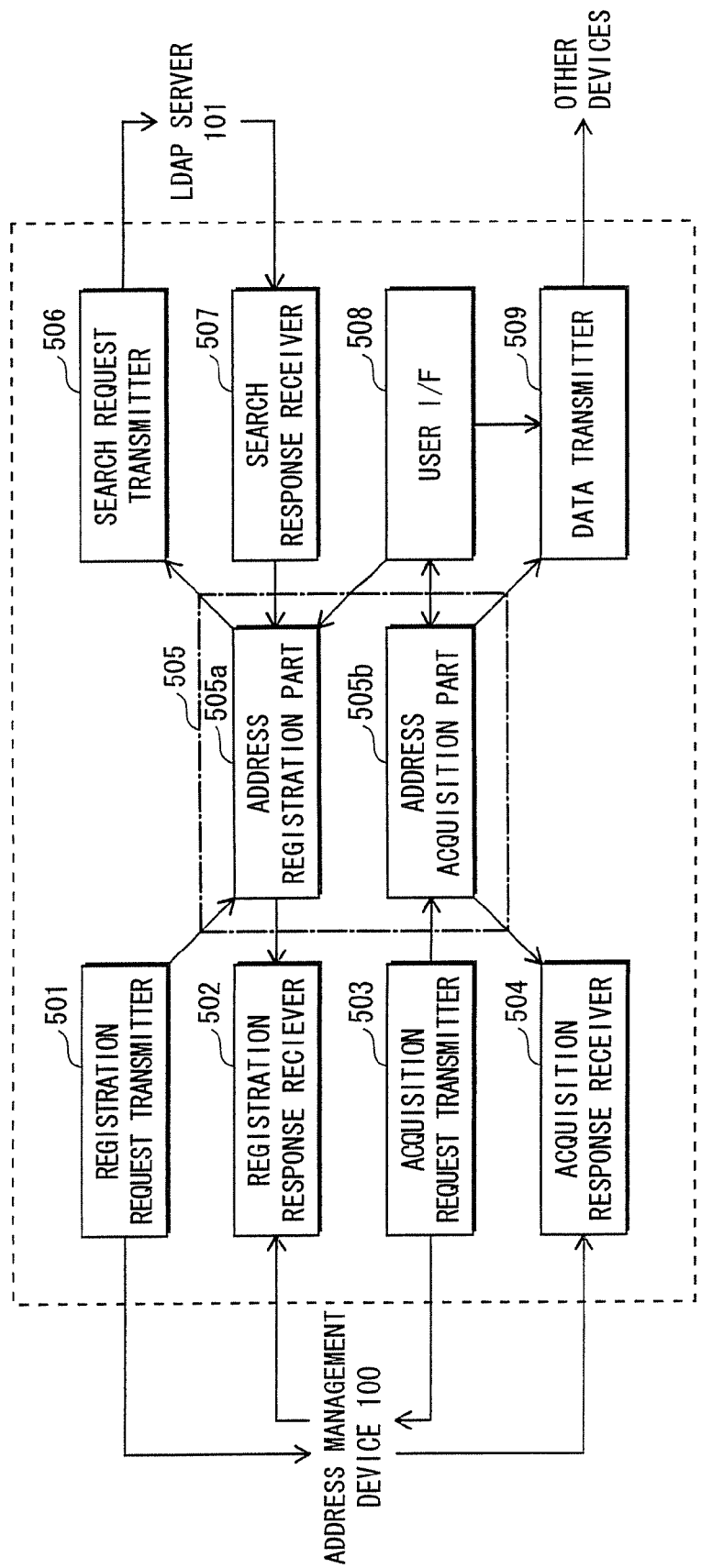
FIG. 5 is a block diagram showing the main functional structure of the data transmission device 102 pertaining to the embodiment of the present invention.

FIG. 5 is a block diagram showing the main functional structure of the data transmission device 102. As shown in FIG. 5, the data transmission device 102 is a so-called MFP, and includes a registration request transmitter 501, a registration response receiver 502, an acquisition request transmitter 503, an acquisition response receiver 504, an address registration part 505a, an address acquisition part 505b, a search request transmitter 506, a search response receiver 507, a user interface 508 and a data transmitter 509. The address registration part 505a and the address acquisition part 505b constitute an address management module 505.

The user interface 508 notifies the address registration part 505a and the address acquisition part 505b that a user has logged in to the data transmission device 102, and notifies, to the address acquisition part 505b, an instruction from the user of the data transmission device 102 to register address information in the address management device 100.

Upon receiving the instruction from the user to register the address information, the address registration part 505a causes the search request transmitter 506 to transmit an address search request to the LDAP server 101 and causes the search response receiver 507 to receive address information as the registration response. Also, the address registration part 505a causes the registration request transmitter 501 to transmit the address information acquired via the search request to the address management device 100, and to request registration of the address information. Then, the response to the registration request is received by the registration response receiver 502.

When the user logs in, the address acquisition part 505b causes the acquisition request transmitter 503 to transmit an address information acquisition request to the address management device 100. Then, after an acquisition response including address information is received from the address management device 100 by the acquisition response receiver 504, the address acquisition request transmitter 503 causes the user interface 508 to display the address information.

The data transmitter 509 acquires, from the address acquisition part 505b, an address designated by the user via the user interface 508, and transmits data to another device in accordance with the address information. In such a case, the data transmitter 509 transmits data according to the content of the address information with use of the NIC 413 or the facsimile modem 414.

4. Communication Sequence

The following describes a communication sequence performed in the data communication system 1. Note that although an example of using the data transmission device 102 is described, the description is also applicable when using the data transmission device 103.

1. When Address Information has been Pre-Registered in the LDAP Server 101

The following describes the process of, when address information has been pre-registered in the LDAP server 101, registering location information of such address information in the address management device 100.

Figure 6:
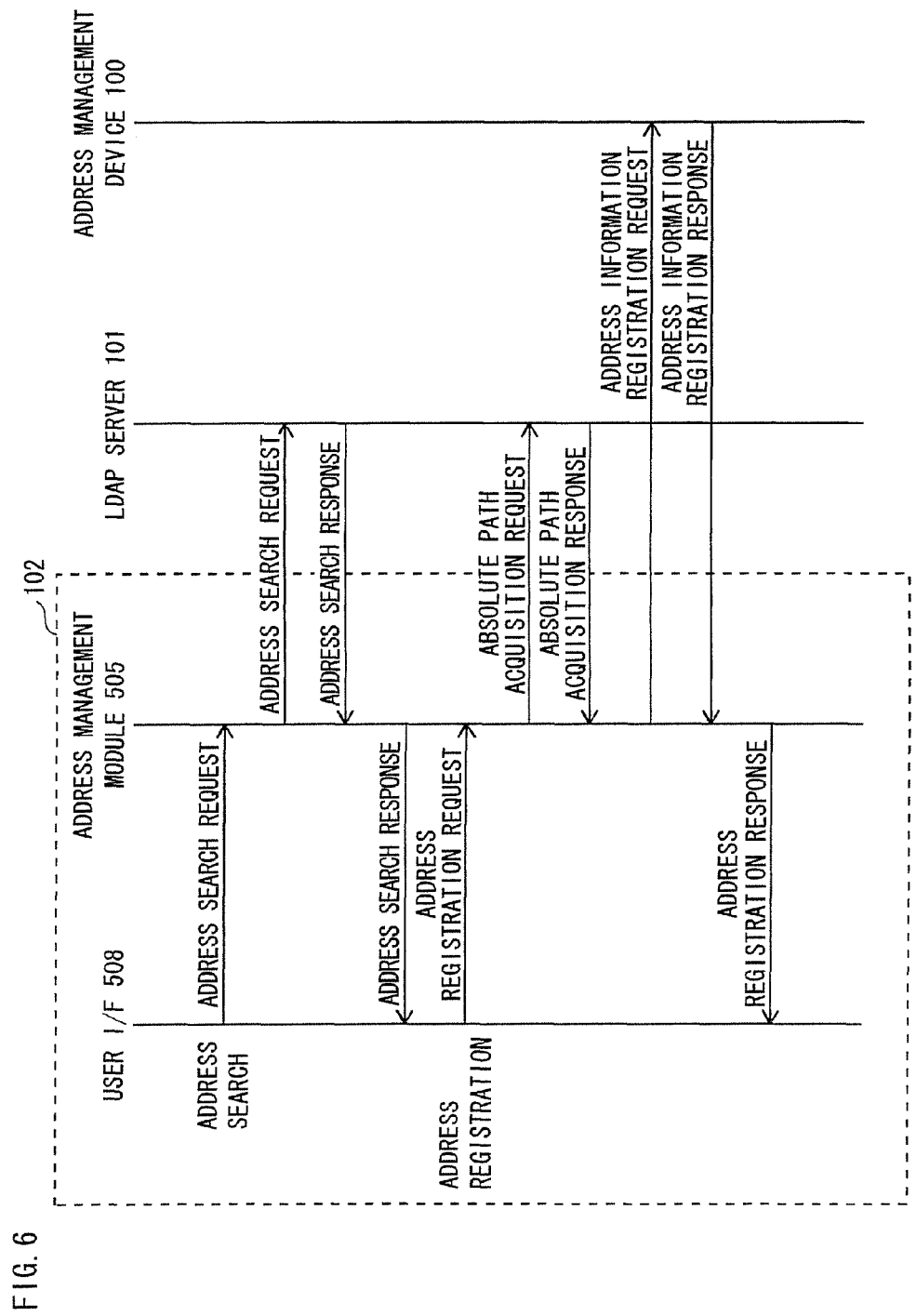
FIG. 6 shows a communication sequence performed when address information is pre-registered in an LDAP server 101 pertaining to the embodiment of the present invention.

First, as shown in FIG. 6, upon reception of an instruction from the user via the user interface 508, to search for address information registered in the LDAP server 101, the data transmission device 102 transmits an address search request to the address management module 505.

Next, the address management module 505 transmits the address search request to the LDAP server 101, and the LDAP server 101 transmits the address information to the address management module 505 as an address search response.

Thereafter, the address management module 505 transmits the address information to the user interface 508 as an address search result, and the user interface 508 displays a list of the acquired address information to the user.

Upon receiving an instruction from the user to register a piece of address information that has been selected from the displayed list, the user interface 508 requests the address management module 505 to register the selected address information in the address management device 100.

In such a case, first, the address management module 505 requests the LDAP server 101 to acquire the absolute path of the designated address information. Upon receiving an absolute path acquisition response from the LDAP server 101, the address management module 505 requests the address management device 100 to register the absolute path in the address management device 100 as address information.

Upon registering the absolute path as address information, the address management device 100 transmits an address information registration response to the address management module 505. This structure enables location information of the address information registered in the IDAP server to be registered in the address management device 100.

Note that although not described above, the address management module 505 accesses the LDAP server as described below.

(a) Requesting an Address Search

The following describes the process by which the address management module 505 requests the LDAP server 101 to perform an address search.

First, the address management module 505 transmits an LDAP version number, a user identifier DN (Distinguished Name) and user authorization information to the LDAP server 101, and performs a "bind" operation to start an LDAP session.

Upon receiving an authorization success response from the LDAP server 101, in order to search for address information, the address management module 505 specifies baseObject, scope, derefAliases and filter parameters, and performs a "search" operation for requesting the LDAP server 101 to search for address information.

Note that the baseObject is a parameter indicating the DN of an entry to be the origin of a search scope, the entry being included in a DIT (Directory Information Tree) or a subtree managed by the LDAP server 101.

Also, the scope is a parameter indicating a class of search scope, and designates the search scope to be the origin entry only, sub entries of the origin entry, or the entire subtree that includes the origin entry.

The derefAliases is a parameter that designates a search scope when the baseObject is an alias entry or when an alias entry is included in a sub entry of the baseObject. Also, the filter is a parameter that designates a search condition.

Upon receiving an address search response from the LDAP server 101, the address management module 505 performs an "unbind" operation, thereby ending the LDAP session.

(b) Requesting Absolute Path Acquisition

The following describes the process by which the address management module 505 acquires an absolute path from the LDAP server 101.

First, as described above, the address management module 505 performs a "bind" operation, and next performs the "search" operation to acquire the absolute path of the address that the user selected. Then, the address management module 505 ends the LDAP session by performing an "unbind" operation.

2. Newly Registering Address Information in the LDAP Server 101

The following describes the process of, when address information is newly registered in the LDAP server 101, registering location information of such address information in the address management device 100.

Figure 7:
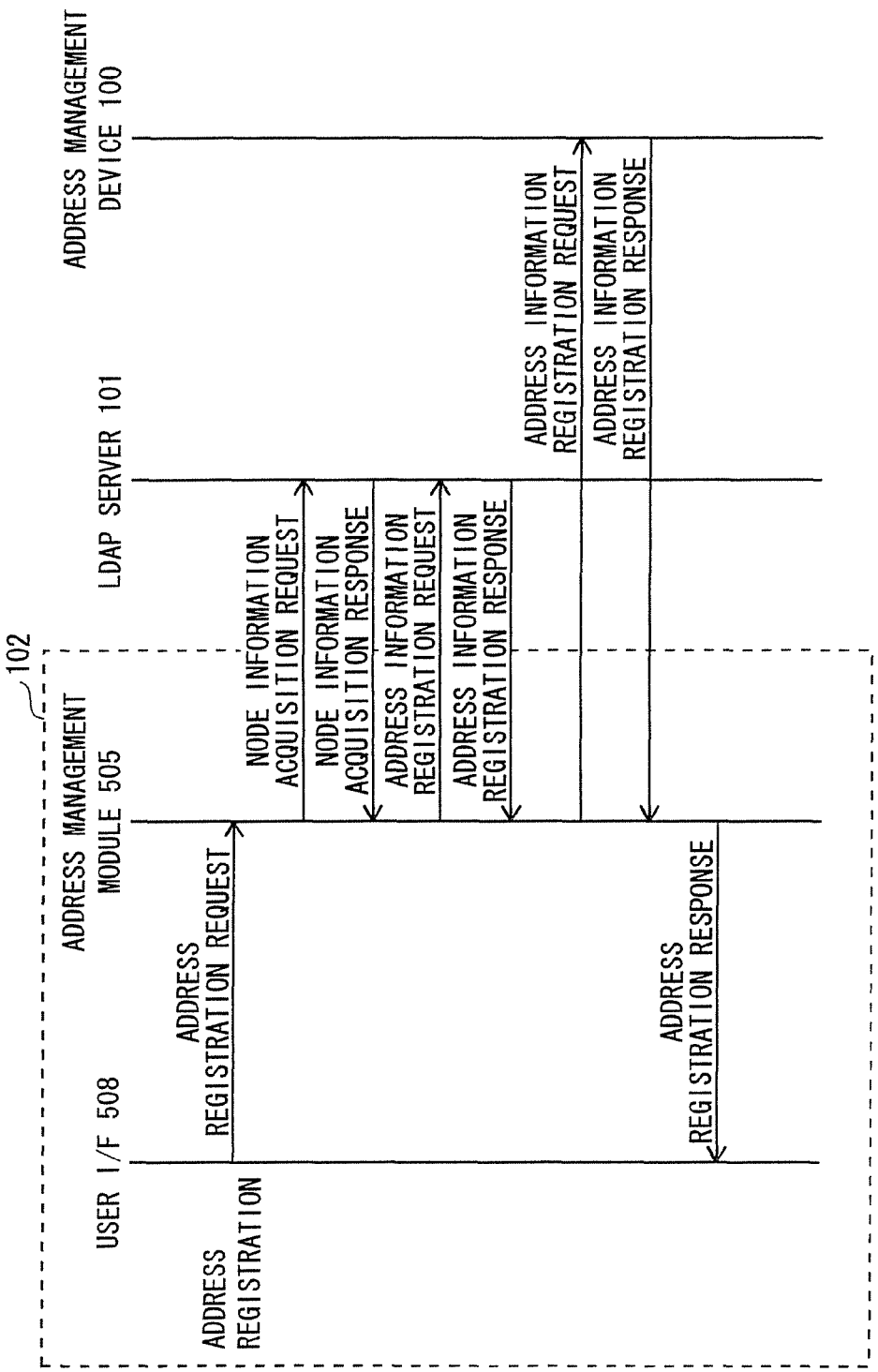
FIG. 7 shows a communication sequence performed when address information is newly registered in the LDAP server 101 pertaining to the embodiment of the present invention.

First, as shown in FIG. 7, upon reception of a new address information registration request from a user via the user interface 508, the data transmission device 102 transmits an address registration request to the address management module 505.

Next, the address management module 505 performs a "search" operation as described above on the LDAP server 101, and acquires node information of the user. Thereafter, the address management module 505 designates an absolute path, and requests the LDAP server 101 to register the new address information in a leaf belonging to the corresponding node of the DIT (Directory Information Tree).

Upon receiving a response from the LDAP server 101 indicating that the address information has been registered, the address management module 505 requests the address management device 100 to register the absolute path as address information in the address management device 100. The address management module 505 ends the current series of processing after receiving the address information registration response from the address management device 100.

3. Process for Acquiring Address Information Registered in the Address Management Device 100

The following describes a process for acquiring address information registered in the address management device 100.

Figure 8:
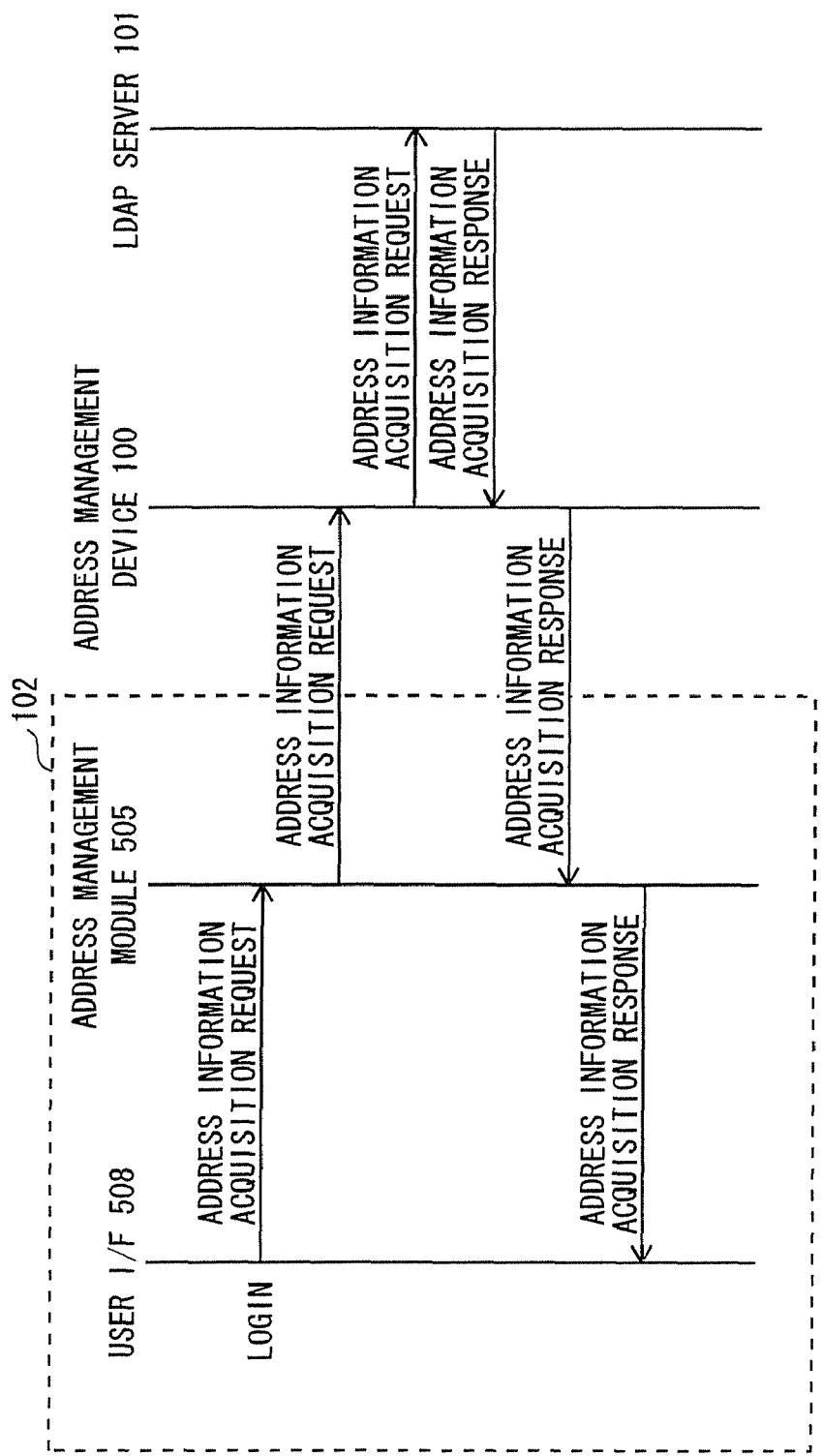
FIG. 8 shows a communication sequence for acquiring address information that has been registered in the address management device 100 pertaining to the embodiment of the present invention.

As shown in FIG. 8, a login by a user triggers the user interface 508 to transmit an address information acquisition request to the address management module 505, the address information acquisition request being a request for address information pertaining to the user. Then the address management module 505 transmits the address information acquisition request to the address management device 100. The address management device 100 transmits the address information acquisition request to the LDAP server 101 to acquire, out of the address information pertaining to the user, address information that includes the absolute path of the LDAP server 101.

After acquiring the address information from the LDAP server 101, the address management device 100 transmits the address information to the address management module 505 along with address information that does not include the absolute path. The address management module 505 transmits the acquired address information to the user interface 508.

The user interface 508 displays a list of the acquired address information in accordance with an instruction from the user.

5. Variations

Although described based on the above embodiment, the present invention is of course not limited to the embodiment. Variations such as the following are also included in the present invention.

1. Although the above embodiment describes a case in which address information is acquired from an LDAP server via an address management device, the present invention is of course not limited to this. Alternatively, a ClientDisplayName that specifies, as an image output destination, a user interface that displays images may be managed as address information by the address management device.

Figure 9:
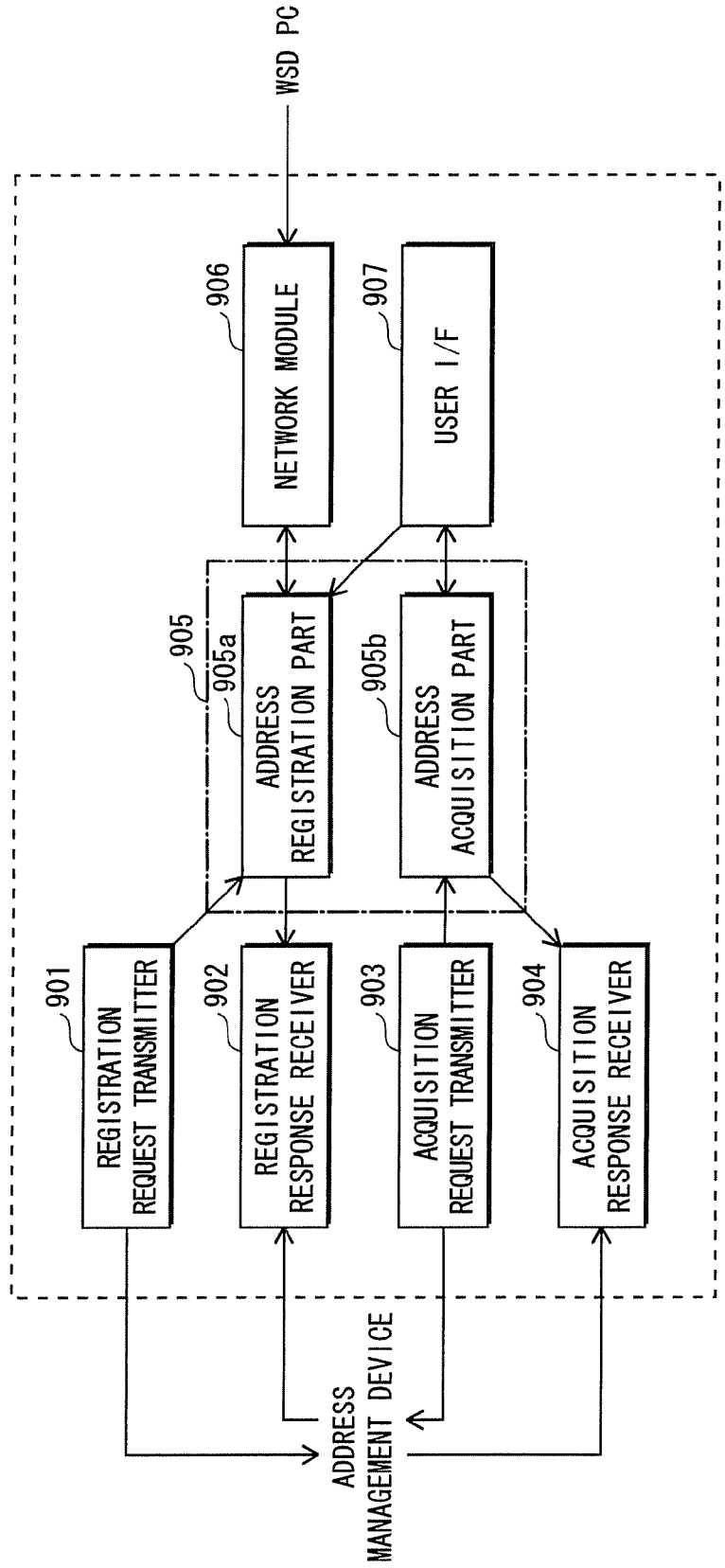
FIG. 9 is a block diagram showing the main functional structure of a data transmission device 9 pertaining to variation 1 of the present invention.

The following describes a functional structure of a data transmission device in the above case. As shown in FIG. 9, a data transmission device 9 includes a registration request transmitter 901, a registration response receiver 902, an acquisition request transmitter 903, an acquisition response receiver 904, an address registration part 905a, an address acquisition part 905b, a network module 906, and a user interface 907. The address registration part 905a is constituted from the address acquisition part 905b and an address management module 905.

The network module 906 receives a registration of WSD Scan (Web Services on Devices) address information from a personal computer that running Windows Vista (a registered trademark of Microsoft Corporation). Also, in response to a request from the address management module 905, the network module 906 transmits a ClientDisplayName and a UUID (Universally Unique Identifier) as a device profile of a WSD PC for displaying the WSD Scan address information. Note that WSD is similar to the Device Profile for Web Service disclosed by W3C.

Next, the communication sequence is described.

Figure 10:
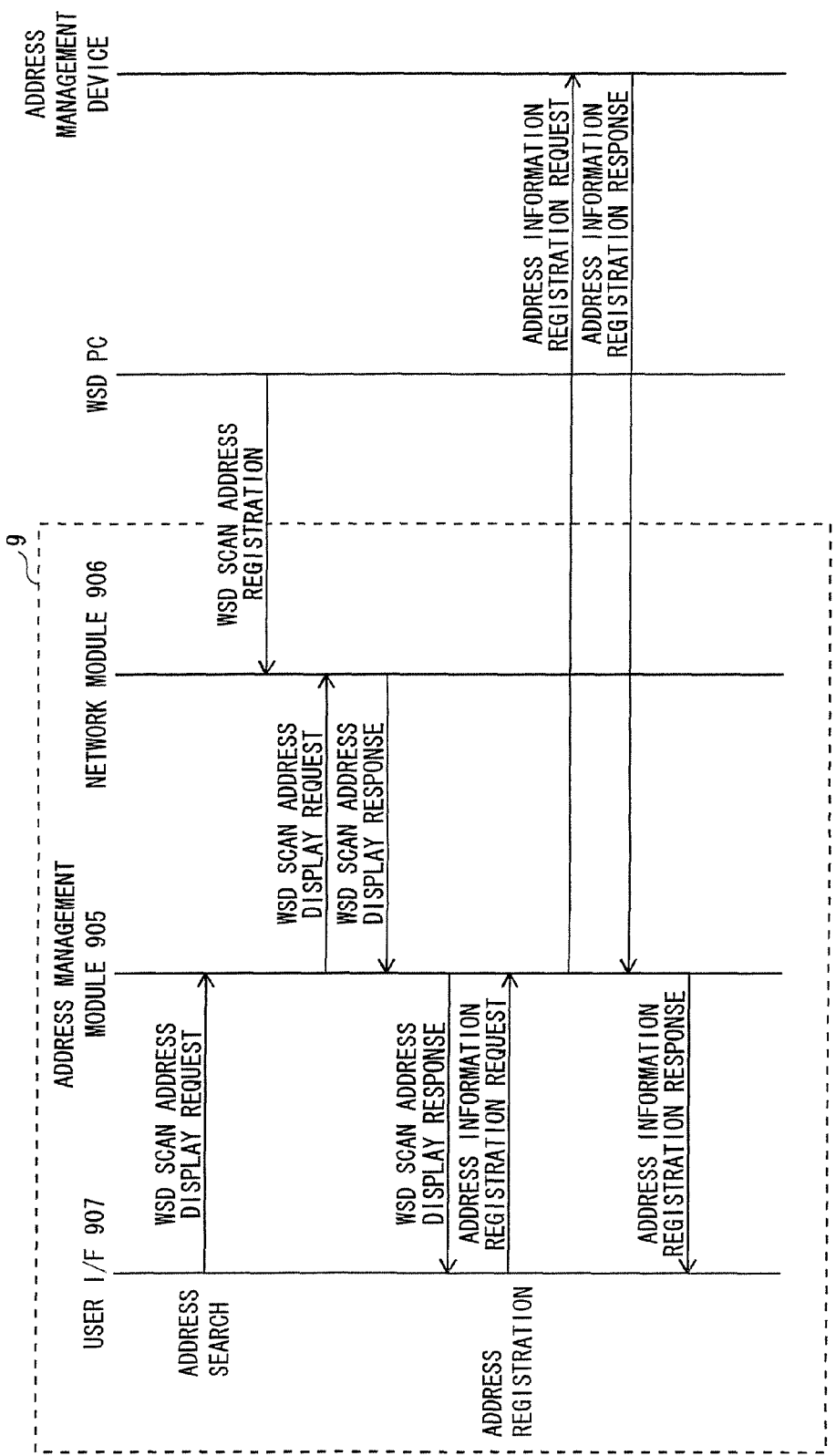
FIG. 10 shows a communication sequence performed when the data transmission device 9 pertaining to variation 1 of the present invention requests the registration of address information.

As shown in FIG. 10, upon reception of an address search instruction from the user via the user interface 907, the data transmission device 9 transmits a WSD Scan address display request to the address management module 905. Then the address management module 905 transmits the WSD Scan address display request to the network module 906.

The network module 906, which has received a WSD Scan address registration in advance from the WSD PC, transmits the ClientDisplayName and the UUID as a WSD Scan address display response. Upon receiving the WSD Scan address display response from the address management module 905, the user interface 907 displays the address display response to the user as a list.

Next, after the user interface 907 receives an address information registration request from the user, the address management module 905 requests the address management device to register the address information.

Upon registering the address information (such as an abbreviated name or a ClientDisplayName), the address management device transmits a registration response to the address management module 905. The address management module 905 transmits the registration response to the user interface 907.

Figure 11:
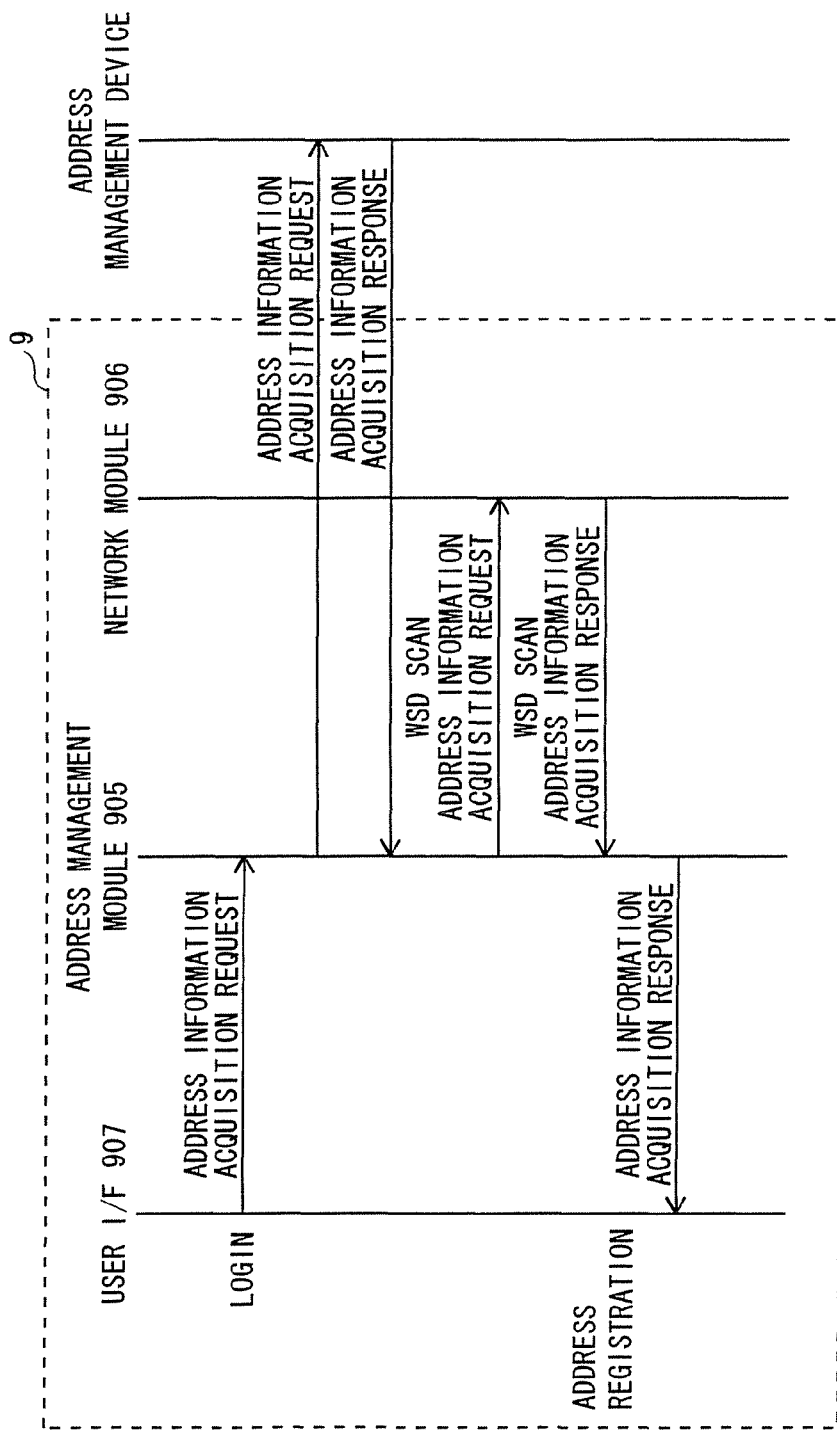
FIG. 11 shows a communication sequence performed when the data transmission device 9 pertaining to variation 1 of the present invention performs an address information acquisition request.

FIG. 11 shows a communication sequence for acquiring address information that has been registered in the address management device. As shown in FIG. 11, when the user logs in, the user interface 907 transmits an address information acquisition request to the user management module 905, the address information acquisition request being a request to acquire address information pertaining to the user. Then, the address management module 905 transmits the address information acquisition request to the address management device.

The address management device transmits a response of address information pertaining to the user (such as an abbreviated name or a ClientDisplayName) to the address management module 905. With use of the acquired address information, the address management module 905 transmits a WSD Scan address information acquisition request to the network module 906.

The network module 906 transmits a UUID resolved from the ClientDisplayName to the address management module 905 as a WSD Scan address information acquisition response. Also, if a UUID cannot be resolved from the ClientDisplayName, the network module 906 transmits an error response.

After the address management module 905 has transmitted the address information acquisition response to the user interface 907, the user interface 907 displays a list of the address information.

Note that the user interface 907 may be configured to store the UUID for a predetermined time only (for example, ten minutes) and then to discard the UUID.

2. Although not described specifically in the above embodiment, the address information that the address management device stores may have, for example, the following data structure. FIG. 12 is a table exemplifying a data structure of address information stored in an address management device pertaining to the present variation.

The address information has three fields corresponding to an address name, a transmission method, and other information. The address name field indicates an address name for identifying a user.

The transmission method field indicates a transmission method for transmitting data to the user. For example, Address 1 indicates location information of address information stored in the LDAP server.

Specifically, the address information indicated in the DN entry whose CN (Common Name) is X, OU (Organization Unit Name) is Y, O (Organization Name) is Z, and C (Country Name) is Japan is acquired from the LDAP server, and the transmission method indicated by the address information is used.

In Address 2, the specified transmission method is transmitting photo data to a WSD PC. Also, in Address 3, the specified transmission method is transmission by e-mail to the address abs@def.ghi.jp.

Also, the other information field specifies photo data to be displayed when a user of the data transmission device selects an address, and a scan mode for use when an address is selected and an original is scanned.

3. Although not described specifically in the above embodiment, the user of the data transmission device can designate a transmission method to be used when data addressed to the user is transmitted by another user. FIG. 13A is a table exemplifying a data structure of address information stored in an address management device pertaining to the present variation, and FIG. 13B is a table exemplifying a data structure of a recipient setting stored in the address management device pertaining to the present variation.

As shown in FIG. 13A, designating "REFERENCE RECIPIENT SETTING" as the transmission method is allowed in the present variation. For example, if "REFERENCE RECIPIENT SETTING" is designated as the transmission method for Address 1, the address management device specifies the transmission method with reference to the transmission method indicated by the recipient setting of Address 1.

In FIG. 13B, the address management device acquires a transmission method from the LDAP server with reference to the transmission method in the recipient setting of Address 1.

According to this structure, for example, when the recipient can receive data via any of a plurality of transmission methods, data can be transmitted via the transmission method that the recipient prefers.

4. Although not described specifically in the above embodiment, the following structure may also be used. For example, in a case when the LDAP server manages e-mail addresses and FAX numbers, but does not manage WebDAV (Web-based Distributed Authoring and Versioning Protocol, IETF RFC2518), the address information that is not managed by the LDAP server may be registered in the address management device only, registered in both the LDAP server and the address management device, or the user of the data transmission device may select where to register the address information.

5. Although the above embodiment describes a case of managing address information only, the present invention is of course not limited to this, and information other than address information may also be managed. Specifically, as shown in FIG. 12, information such the recipient's photo data and an original scan mode may also be managed by the LDAP server.

In such a case, the user of the data transmission device may select whether to register the other information only in the address management device or in both the LDAP server and the address management device.

6. Although not described specifically in the above embodiment, when the absolute path of address information cannot be acquired from the LDAP server, the data transmission device may notify the user to that effect, and register the address information in the address management device.

This enables the user of the data transmission device to register the address information for which registration is desired in the address book of the user.

Also, in such a case, there is a possibility of the address information registered in the LDAP server differing from the address information corresponding to the same address registered in the address management device. For this reason, address information pieces corresponding to the same address acquired from both the LDAP server and the address management device may be compared, and the user notified if a difference exists between the pieces of address information.

Also, if the address information pieces are different, designation of which address information piece to use may be performed by the user, and the undesignated address information piece may be rewritten to correspond to the designated address information piece.

7. Although the above embodiment describes only a case in which address information is registered in an LDAP server, the present invention is of course not limited to this, and the address information may be registered in a device other than an LDAP server.

8. Although not described specifically in the above embodiment, the operations of the data transmission device 102 shown in FIG. 6, etc., may be realized by the CPU 403 reading a control program from a non-volatile memory (such as the HDD 408), and executing the control program with use of a volatile memory (DRAM, etc). Specifically, characteristics of the present invention are also realized in a program executed by the CPU 403, and an address registration method used when the program is executed.

9. Although the above embodiment describes only a case in which the data transmission device 102 is an MFP, the present invention is of course not limited to this, and another device, such as a network scanner or facsimile machine, may be used instead of an MFP as the data transmission device.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data transmission device connected via a network to an address management device that manages user-specific address information and a data storage device that stores non-user-specific address information, the data transmission device comprising:
a first address acquisition part operable to acquire the non-user-specific address information from the data storage device;
a selection receiver operable to present the non-user-specific address information acquired from the data storage device to a user, and receive, from the user, a selection designating an address information piece to be registered in the address management device; and
a first address registration part operable to acquire, from the data storage device, location information that indicates a location of the selected address information piece stored in the data storage device and to cause the address management device to register the acquired location information, wherein the location information is path information indicating a path to the non-user-specific address information stored in the data storage device.

2. The data transmission device of claim 1, further comprising:
a request receiver operable to receive an address information registration request from the user, the address information registration request being a request for registration of a piece of new address information;
a storage requester operable to request the data storage device to store the new address information; and
a second address registration part operable to acquire, from the data storage device, location information that includes a location of the piece of address information in the data storage device, and cause the address management device to register the location information of the new address information.

3. The data transmission device of claim 2, further comprising:
a third address registration part operable, if the storage requester fails to cause the data storage device to store the new address information, to cause the address management device to register the new address information in place of the location information of the new address information.

4. The data transmission device of claim 3, further comprising:
a second address acquisition part operable to acquire a piece of the user-specific address information from the address management device; and
a notifier operable to compare a piece of the non-user-specific address information acquired by the first address acquisition part and the piece of user-specific address information acquired by the second address acquisition part, and notify the user whether a difference exists therebetween.

5. The data transmission device of claim 1, further comprising:
an address requester operable to request the address management device to acquire, with use of the registered location information, the address information piece from the data storage device.

6. The data transmission device of claim 1, wherein the data storage device is an LDAP server, and the location information is an absolute path of an entry managed by the LDAP server that stores the address information.

7. The data transmission device of claim 1, wherein each address information piece in the user-specific address information and the non-user-specific address information includes a transmission method and a destination identifier used in the transmission method.

8. The data transmission device of claim 7, wherein each transmission method is any of E-mail, FAX, FTP, SMB and WebDAV.

9. The data transmission device of claim 1, wherein the selection receiver presents a list of the non-user-specific address information acquired from the data storage device to the user, and the user selects one entry of the list for registration by the address management device.

10. A data transmission system including a data transmission device and an address management device that manages user-specific address information, the data transmission system being connected via a network to a data storage device that stores non-user-specific address information, wherein
the data transmission device includes a first address acquisition part operable to acquire the non-user-specific address information from the data storage device;
a selection receiver operable to present the non-user-specific address information acquired from the data storage device to a user, and receive, from the user, a selection designating an address information piece to be registered in the address management device; and
a first address registration part operable to acquire, from the data storage device, location information that indicates a location of the selected address information piece stored in the data storage device and to cause the address management device to register the acquired location information, wherein the location information is path information indicating a path to the non-user-specific address information stored in the data storage device.

11. The data transmission system of claim 10, wherein the data transmission device further includes a request receiver operable to receive an address information registration request from the user, the address information registration request being a request for registration of a piece of new address information;
a storage requester operable to request the data storage device to store the new address information; and
a second address registration part operable to acquire, from the data storage device, location information that includes a location of the piece of address information in the data storage device, and cause the address management device to register the location information of the new address information.

12. The data transmission system of claim 11, wherein the data transmission device further includes
a third address registration part operable, if the storage requester fails to cause the data storage device to store the new address information, to cause the address management device to register the new address information in place of the location information of the new address information.

13. The data transmission system of claim 10, wherein the data transmission device further includes an address requester operable to request the address management device to acquire the address information piece from the data storage device, and
the address management device includes an address transmitter operable, if the request to acquire the address information piece has been received, and furthermore the location information has been registered, to acquire, with use of the registered location information, the address information piece from the data storage device, and transmit the acquired address information to the data transmission device.

14. The data transmission system of claim 13, wherein the data transmission device further includes
a notifier operable to compare the piece of the address information acquired by the first address acquisition part and the piece of the address information acquired by the address requester, and notify the user whether a difference exists therebetween.

15. The data transmission system of claim 10, wherein the address management device further includes
a recipient setting memory operable to store a recipient setting for receiving user-specific data, the recipient setting being one of an address information piece and location information of the address information piece, and wherein
the data transmission device specifies, with reference to the recipient setting, address information for transmitting data to the user.

16. The data transmission system of claim 10, further including a plurality of data storage devices, wherein the address management device includes an address memory for storing registered user-specific addresses corresponding to non-user-specific addresses in address books associated with respective ones of the plurality of data storage devices, the non-user-specific addresses corresponding to different address books being separately stored, as user-specific addresses, in the address memory of the address management device.

17. An address registration method performed in a data transmission system including a data transmission device and an address management device that manages user-specific address information, the data transmission system being connected via a network to a data storage device that stores non-user-specific address information, comprising:
an address acquisition step in which the data transmission device acquires the non-user-specific address information from the data storage device;
a selection reception step in which the data transmission device presents the non-user-specific address information acquired from the data storage device to a user, and receives, from the user, a selection designating an address information piece to be registered in the address management device; and
an address registration step in which the data transmission device acquires, from the data storage device, location information that indicates a location of the selected address information piece stored in the data storage device and causes the address management device to register the acquired location information, wherein the location information is path information indicating a path to the non-user-specific address information stored in the data storage device.

18. A non-transitory computer readable medium storing program code that is executed by a computer for implementing a method, the computer including a data transmission device connected via a network to an address management device that manages user-specific address information and a data storage device that stores non-user-specific address information, the method comprising:
- an address acquisition processing step acquiring the non-user-specific address information from the data storage device;
- a selection reception processing step presenting to a user the non-user-specific address information acquired from the data storage device, and receiving from the user a selection designating an address information piece to be registered in the address management device; and
- an address registration processing step acquiring from the data storage device location information that indicates a location of the selected address information piece stored in the data storage device, and causing the address management device to register the acquired location information, wherein the location information is path information indicating a path to the non-user-specific address information stored in the data storage device.

* * * * *